United States Patent [19]

Le Page et al.

[11] 4,239,652

[45] Dec. 16, 1980

[54] CATALYSTS FOR CATALYTIC HYDROREFORMING OR FOR PRODUCING AROMATIC HYDROCARBONS

[75] Inventors: Jean-François Le Page, Rueil-Malmaison; Germain Martino, Poissy; Jean Miquel, Paris, all of France

[73] Assignee: Institut Francais du Petrole, Rueil-Malmaison, France

[21] Appl. No.: 53,156

[22] Filed: Jun. 29, 1979

[30] Foreign Application Priority Data

Jun. 29, 1978 [FR] France .............................. 78 20132

[51] Int. Cl.³ .................. B01J 27/08; B01J 27/10
[52] U.S. Cl. ................................. 252/441; 252/442; 208/139
[58] Field of Search .............................. 252/441, 442

[56] References Cited

U.S. PATENT DOCUMENTS

| | | | |
|---|---|---|---|
| 2,861,959 | 11/1958 | Thorn et al. | 252/465 |
| 3,871,995 | 3/1975 | Duhaut et al. | 208/138 |
| 3,898,178 | 8/1975 | Duhaut et al. | 252/441 |
| 3,956,107 | 5/1976 | Mitchell | 252/441 X |
| 3,972,806 | 8/1976 | Antos | 252/441 X |
| 4,078,743 | 3/1978 | Kogan et al. | 252/442 |
| 4,149,961 | 4/1979 | Antos | 252/441 X |

*Primary Examiner*—Patrick Garvin
*Attorney, Agent, or Firm*—Millen & White

[57] ABSTRACT

Catalyst for a process of hydroreforming or aromatic hydrocarbon production, comprising an alumina carrier, at least one noble metal of the platinum family, antimony, a metal selected from gallium, indium and thallium and halogen, said catalyst being used in a series of successive reaction zones as a moving bed, transferred from one reaction zone to the next, from the last reaction zone to a regeneration zone and from the latter to the first reaction zone, said process being preferably conducted at a temperature from 510° to 600° C. and under a pressure from 1 to 18 kg/cm².

3 Claims, No Drawings

CATALYSTS FOR CATALYTIC HYDROREFORMING OR FOR PRODUCING AROMATIC HYDROCARBONS

This invention concerns catalysts useful for a catalytic reforming process or a catalytic process for manufacturing aromatic hydrocarbons, said processes being preferably conducted under severe conditions, in the presence of specific catalysts. These processes are performed, for example, at a temperature from 510° to 600° C., under a pressure from 1 to 18 kg/cm$^2$, at a hourly space velocity from 1 to 10 volumes of liquid charge per volume of catalyst, the molar ratio of hydrogen to the hydrocarbons being from 0.5 to 20.

More particularly, the new catalysts are used for:

Reforming reactions, in order to obtain gasoline having a clear octane number of at least 102. The severe conditions of the catalytic hydroreforming reactions are more particularly the following: average temperature from about 510° to 580° C., pressure from about 5 to 18 kg/cm$^2$, preferably from 6 to 13 kg/cm$^2$, hourly space velocity from 1 to 10 volumes of liquid charge per volume of catalyst and recycle rate of H$_2$/HC ratio from 6 to 10 moles of hydrogen per mole of charge. The charge is generally a naphtha distilling between about 60° C. and about 220° C., particularly a straight run naphtha.

Reactions for the production of aromatic hydrocarbons from saturated or unsaturated gasolines (for producing benzene, toluene or xylenes). When using an unsaturated charge, i.e. a charge which contains diolefins and monoolefins, it should be first made free therefrom by selective or complete hydrogenation. Then, the charge, optionally freed by hydrogenation of substantially all its diolefins and monoolefins, if any, is subjected to a hydrogen treatment, in the presence of a catalyst, at a temperature from about 530° to 600° C., under a pressure from 1 to 13 kg/cm$^2$, the hourly flow rate by volume of liquid charge being about 1 to 10 times the catalyst volume, the molar ratio hydrogen/hydrocarbons being of about 6 to 20. The charge may consist of gasolines obtained by pyrolysis, cracking, particularly steam-cracking, or by catalytic reforming, or may also consist of naphthenic hydrocarbons, capable, by dehydrogenation, to be converted to aromatic hydrocarbons.

The catalysts according to this invention are used in the reforming reactions and the reactions for producing aromatic hydrocarbons, preferably as a moving bed and in at least two reactors. More precisely, there are used at least two reactors or reaction zones, to carry out these reactions, but three or four reactors or reaction zones are preferably used, each of them containing a moving bed of catalyst.

Thus, in a preferred embodiment, the charge circulates successively through each reactor or reaction zone by axial or radial flow (radial flow meaning a flow from the center towards the periphery or from the periphery towards the center). The reaction zones are arranged in series, for example side by side or stacked. Preferably, the reaction zones are arranged side by side. The charge successively flows through each reaction zone with intermediate heating of the charge between the reaction zones; the fresh catalyst is introduced at the top of the first reaction zone where the fresh charge is introduced; it then flows progressively downwardly through said zone and is progressively withdrawn from the bottom thereof and, through any appropriate means (such as a lift in case of reactors arranged side by side), it is conveyed to the top of the following reaction zone where through it progressively flows downwardly, and so on until it reaches the last reaction zone at the bottom of which the catalyst is also progressively withdrawn and then conveyed to the regeneration zone. At the outlet of the regeneration zone, the catalyst is progressively reintroduced to the top of the first reaction zone. The various catalyst withdrawals are performed as mentioned above, i.e. "progressively", the term "progressively" meaning that the catalyst may be withdrawn:

either continuously, or periodically, for example at intervals or 1/10 to 100 days while withdrawing only one fraction, for example 0.1 to 15% of the total catalyst amount. But it is generally possible to withdraw this catalyst at much shorter intervals (for example, of the order of the minute or of the second), the withdrawn amount being reduced accordingly; continuous withdrawals are preferred to periodical.

In the case where the reaction zones are arranged side by side, the circulation of the catalyst from the bottom of one reaction zone to the top of an other reaction zone, from the bottom of the last reaction zone to the regeneration zone and, optionally, from the bottom of the regeneration zone to the top of the first reaction zone, is performed by means of any known lifting device which is generally designated by the term "lift". The fluid of the lift, used for conveying the catalyst, may be any suitable gas such, for example, as nitrogen or pure or purified hydrogen or even hydrogen produced in the unit.

The solid material displaced from a reaction zone to another and to the regeneration zone may be, for example, a catalyst made of extrudates or granules. The catalyst may be in the form of spherical balls having a diameter generally from 1 to 3 millimeters, preferably from 1.5 to 2 mm, these values being however not limitative. The bulk density of the catalyst is generally from 0.4 to 1, preferably from 0.5 to 0.9 and more particularly from 0.55 to 0.8, these values being not limitative.

As far as the regeneration of the catalyst itself is concerned, it may be performed by any known means.

The regeneration is followed with a purge, for example, with nitrogen, in order to remove from the catalyst any trace of residual oxygen gas.

The regenerated catalyst, before reaching the first reaction zone, may be subjected to reduction, i.e. to a treatment with hydrogen, in order to reduce certain oxides, particularly metal oxides, present in the catalyst. It may also be subjected to sulfuration.

Catalysts containing platinum and/or another metal of the platinum family deposited on alumina have been known for a long time, but, in spite of the numerous improvements made to these catalysts, for example by incorporating one, two or even three other metals selected from the most varied groups of the periodic classification of the elements, it is still an object of the present researches to obtain new catalysts which, on the one hand, would give still better yields than those available up to now and which, on the other hand, would also have a longer life time that the known catalysts. Furthermore, efforts are made to improve the mechanical properties of these catalysts, particularly in order to use them as a moving bed, in the form of conglomerates, for example balls or extrudates of a substantial size, so as to provide for a relatively easy passage of the gaseous reactants. The wear of these catalysts results in the formation of much finer particles which progressively obstruct the free space making it necessary to increase the input pressure of the reactants or even to discontinue the operation.

It has now been discovered that, when operating in the presence of very specific catalysts, and preferably in processes operated with a catalyst moving bed, these specific catalysts exhibit, when used for hydroreforming reactions or reactions of aromatic hydrocarbon production, an increased activity and life time as compared to the prior art catalysts.

In addition, the catalysts used according to the present invention, due to their mechanical properties, may be advantageously used in moving bed reactors whose feeding with catalyst particles is performed by up-to-date means or devices for regularly distributing said particles at a substantially uniform rate over the surface of the catalyst bed. It is known that, up to now, the catalyst was introduced into a reactor through a funnel provided with a flexible pipe which extended downwardly to the bottom of the reactor or to the surface of the catalyst. Thus, the reactor was filled with catalyst whose particles formed a kind of cone which had to be flattened in order to sufficiently fill the reactor. The resultant catalyst bed is not homogeneous and, furthermore, it contains free spaces which result, in the course of the reactions, in local packings of the catalyst having various disadvantages and, in particular, that of irregularities in the operating conditions which, after a long period of run, are detrimental to the yield and/or to the selectivity. As the major irregularity, there was observed non-homogeneous distributions, through the catalyst bed, of the gas and the liquid charge. It is possible to meet these defects by sweetening the operating conditions, for example by reducing the V.V.H. But when it is desired to proceed under severe operating conditions, it is necessary to avoid the irregularities in the filling of the catalyst into the reactor and, accordingly, to make use, for example, of a new device such as that described in U.S. Pat. No. 3,668,115, this new device being easily adaptable to the feeding of the moving bed reactors; these new catalyst feeding devices as described in the prior art have the further advantage, by avoiding the formation of free spaces in the catalyst mass, to permit the introduction of a larger amount of catalyst into the reactor. Thus, with the conventional system for feeding a vessel with balls or extrudates, up to 15% of free space is observed, which means that the vessel is only filled to 85%. The new feeding systems provide for the reduction of this free space to about 7% depending on the type of solid feed. This improvement of the "catalyst bulk density" is possible, however when operating over long periods in moving bed reactors and under running conditions, only when the catalyst exhibits adequate mechanical properties; this is precisely the case of the new catalyst used according to the present invention.

The specific catalyst used according to the present invention comprises an alumina carrier, at least one noble metal of the platinum family, antimony, a metal from group III A of the periodic classification of elements selected from gallium, indium and thallium, and halogen, for example chlorine or fluorine. The preferred noble metals of the platinum family are platinum and iridium. The metal from group III A is preferably indium or thallium.

The catalyst according to the invention contains, by weight with respect to the alumina carrier: (a) 0.05 to 0.6% and more particularly 0.1 to 0.5% of noble metal of the platinum family, (b) 0.005 to 5%, preferably 0.03 to 3% and more particularly 0.4 to 1.5% of antimony, (c) 0.01 to 4% of the metal selected from gallium, indium and thallium and (d) 0.1 to 10% and preferably 0.2 to 5% by weight, with respect to the alumina carrier, of halogen, for example chlorine or fluorine. Preferably, when the metal is gallium, there is used from 0.05 to 3% of gallium. When the metal is indium or thallium, there is preferably used 0.05 to 3% and more preferably 0.07 to 2% of indium or thallium (more particularly, 0.3 to 0.6% of indium or thallium).

The textural characteristics of the alumina may also be of importance: in order to proceed at sufficiently high velocities and to avoid the use of reactors of a too large capacity and of excessive catalyst amounts, the specific surface of the alumina is advantageously from 50 to 600 $m^2/g$, preferably from 150 to 400 $m^2/g$.

The catalyst may be prepared according to the conventional methods consisting of impregnating the alumina by means of solutions of the metal compounds to be introduced. There is used either a common solution of these metals or a separate solution for each metal. When using several solutions, it may be convenient to proceed to intermediary drying and/or roasting steps. The operation is usually completed by roasting, for example at about 500° to 1000° C., preferably in the presence of free oxygen, for example by means of air scavenging.

As examples of metal compounds forming part of the catalyst composition, there can be mentioned, for example, the nitrates, chlorides, bromides, fluorides, sulfates, ammonium salts or acetates of these metals or even any other salt, oxide or complex salt (tartaroantimonic acids, oxaloantimonic acids, etc . . . ) of these metals which are soluble in water, hydrochloric acid or any other suitable solvent.

The halogen of the catalyst may have its origin in one of the metal halides when the metal is introduced as a halide, or it may be introduced in the form of hydrochloric acid or hydrofluoric acid, ammonium chloride, ammonium fluoride, chlorine gas, hydrocarbon halide, for example $CCl_4$, $CH_2Cl_2$ or $CH_3Cl$.

A first method of preparation consists, for example, of impregnating the carrier with an aqueous solution of a nitrate or other compounds of indium, gallium or thallium, drying at 120° C. and roasting in air for a few hours at a temperature from 500° to 1000° C.; then a second impregnation will be made by means of a solution containing antimony and the one or more metals of the platinum family.

Another method consists, for example, in impregnating the carrier by means of a solution containing simultaneously the three metals of the catalyst. This is the best mode to obtain a homogeneous and regular impregnation of the carrier with the metals.

Still another method consists of introducing the metal elements by proceeding to as much successive impregnations as there are metal elements in the catalyst.

The production of gasoline of high octane number requires operating under very severe conditions that the catalysts used until now can withstand only with difficulty. The use of bimetallic catalysts however resulted in a substantial improvement. Numerous attempts have been made to associate metals and, recently, catalyst compositions have been proposed which contain up to 4 or even 5 metals. These compositions have in fact resulted in an improvement while the promoters confer good stability characteristics, they have also, particularly in the case of the noble metals of the platinum family, a hydrogenolyzing effect resulting in a decrease of the yield and a shortening of the cycle period and of the number of possible cycles i.e. in a decrease of the catalyst life time.

On the contrary, the simultaneous use of antimony and gallium or thallium or indium, together with a metal of the platinum family, reduces very substantially these defects by decreasing to a large extent this hydrogenolyzing tendency, and it has been observed that the favorable effects of each of the three metals is optimum in the case of severe operating conditions, particularly under low pressures, high temperatures and long operating periods.

The following examples illustrate the invention without being however limitative thereof.

EXAMPLE 1

In order to obtain gasoline having a clear octane number of 103, there is treated a naphtha having the following characteristics:
ASTM distillation range: 80°-160° C.
Composition:
  aromatic hydrocarbons: 7% b.w.
  naphthenic hydrocarbons: 27% b.w.
  paraffinic hydrocarbons: 66% b.w.
"Clear research" octane number: about 37
Average molecular weight: 110
Specific gravity at 20° C.: 0.782

This naphtha is passed with recycle hydrogen over two catalysts A and B containing 0.4% of platinum and 0.5% of antimony, by weight with respect to the carrier, said alumina having a specific surface of 240 m$^2$/g and a pore volume of 0.57 cc/g., the chlorine content of catalysts A and B being 1.12%. Catalyst A further contains 0.5% of thallium and catalyst B further contains 0.5% of indium (by weight with respect to the carrier).

Catalyst A and B have been prepared by adding to 100 g of alumina 100 cc of an aqueous solution containing:
  1.90 g of concentrated HCl (d=1.19),
  20 g of an aqueous solution of chloroplatinic acid having a 2% by weight platinum content,
  10 g of an aqueous solution tartaroantimonic acid having a 5% antimony content, and
  1.06 g of thallium nitrate for catalyst A, or,
  1.87 g of indium nitrate for catalyst B.

The contact is maintained for 5 hours, the impregnated carrier is dried for 1 hour at 100° C. and then roasted at 530° C. in dry air (the air being dried by means of activated alumina). It is then reduced in a stream of dry hydrogen (activated alumina) for 2 hours at 450° C. Catalysts A and B are obtained, which contain:
  0.4% of platinum
  0.5% of antimony
  0.5% of thallium (catalyst A) or 0.5% of indium (catalyst B)
  1.12% of chlorine.

Catalysts A and B, as obtained, have a specific surface of 230 m$^2$/g and a pore volume of 0.54 cc/g.

The operation is conducted in a continuous manner with a moving bed, in 3 reactors having substantially identical volumes. In each reactor, the catalyst bulk density is such that the free space, by volume, does not exceed 7% of the intergranular space. The operating conditions are as follows:
pressure: 10 bars
temperature: 520° C.
molar ratio H$_2$/hydrocarbons: 8
naphtha weight/catalyst weight/hour: 1.65

The operation is also conducted in the presence of various catalysts of the prior art, which are outside the scope of the invention, containing 1, 2 or 3 metal elements. All these catalysts contain 1.12% of chlorine.

Table I reports, after 200 hours of run, the C$_5^+$ yield obtained and the hydrogen content in percent of the recycle gas.

The results obtained in this example B 1, with the catalysts according to the invention, may be maintained over a long period of time, for example several months, by proceeding as mentioned, i.e. in a continuous manner, in a system with 3 moving bed reactors, the catalyst being for example withdrawn continuously, at a rate so adjusted that the catalyst bed of the reactor is progressively renewed by fresh catalyst, for example after about 500 hours.

TABLE I

| CATALYST | % METAL WITH RESPECT TO THE CATALYST CARRIER | | | C$_5^+$ YIELD (by weight) | % of RECYCLED GAS H$_2$ (MOLAR) |
|---|---|---|---|---|---|
| A | 0.4 platinum | 0.5 antimony | 0.5 thallium | 79.7 | 79.4 |
| F | 0.4 platinum | — | — | 73.4 | 72.9 |
| C | 0.4 platinum | 0.5 antimony | — | 76.1 | 75.3 |
| D | 0.4 platinum | — | 0.5 thallium | 76.6 | 76.1 |
| B | 0.4 platinum | 0.5 antimony | 0.5 indium | 79.6 | 79.5 |
| E | 0.4 platinum | — | 0.5 indium | 75.5 | 75.2 |
| G | 0.4 platinum | 0.2 iridium | 0.5 thallium | 79.6 | 78.4 |
| H | 0.4 platinum | 0.08 iridium | 0.5 thallium | 79.6 | 78.5 |
| I | 0.4 platinum | 0.2 iridium | 0.5 indium | 79.5 | 79.2 |
| J | 0.4 platinum | 0.08 iridium | 0.5 indium | 79.6 | 79.2 |
| K | 0.4 platinum | 0.08 iridium | — | 75.2 | 74.9 |
| L | 0.4 platinum | 0.08 ruthenium | — | 75.1 | 74.9 |
| M | 0.4 platinum | 0.2 ruthenium | — | 75.1 | 74.7 |
| N | 0.4 platinum | 0.08 ruthenium | 0.5 iron | 79.5 | 78.5 |
| O | 0.4 platinum | 0.08 ruthenium | 0.5 rhodium | 79.6 | 78.8 |
| P | 0.4 platinum | 0.08 ruthenium | 0.5 manganese | 79.6 | 78.8 |
| Q | 0.4 platinum | — | 0.5 manganese | 77.9 | 77.5 |
| R | 0.4 platinum | 0.08 ruthenium | 0.5 gold | 79.8 | 78.8 |
| S | 0.4 platinum | — | 0.5 gold | 77.6 | 77.9 |
| T | 0.4 platinum | 0.08 iridium | 0.5 uranium | 79.4 | 78.9 |

EXAMPLE 2

Example 1 is repeated with catalysts containing platinum, antimony, thallium or indium, the antimony, thallium or indium contents being varied.

The contents of metals and the results obtained are given in Table II. All of these catalysts contain 1.12% chlorine.

TABLE II

| CATA-LYST | % METAL WITH RESPECT TO THE CATALYST CARRIER | | | $C_5^+$ YIELD (by weight) | % of RECYCLED GAS $H_2$ (MOLAR) |
|---|---|---|---|---|---|
| $A_1$ | 0.4 platinum | 0.5 antimony | 0.02 thallium | 76.1 | 75.3 |
| $A_2$ | 0.4 platinum | 0.5 antimony | 0.07 thallium | 78.0 | 77.5 |
| $A_3$ | 0.4 platinum | 0.5 antimony | 0.35 thallium | 79.6 | 79.4 |
| A | 0.4 platinum | 0.5 antimony | 0.5 thallium | 79.7 | 79.4 |
| $A_4$ | 0.4 platinum | 0.5 antimony | 0.7 thallium | 78.3 | 77.8 |
| $A_5$ | 0.4 platinum | 0.5 antimony | 2.5 thallium | 77.8 | 77.3 |
| $A_6$ | 0.4 platinum | 0.5 antimony | 4 thallium | 75.4 | 74.7 |
| $B_1$ | 0.4 platinum | 0.5 antimony | 0.02 indium | 76.1 | 75.3 |
| $B_2$ | 0.4 platinum | 0.5 antimony | 0.07 indium | 77.5 | 77.2 |
| $B_3$ | 0.4 platinum | 0.5 antimony | 0.35 indium | 79.5 | 79.4 |
| B | 0.4 platinum | 0.5 antimony | 0.5 indium | 79.6 | 79.5 |
| $B_4$ | 0.4 platinum | 0.5 antimony | 0.7 indium | 77.8 | 77.3 |
| $B_5$ | 0.4 platinum | 0.5 antimony | 2.5 indium | 75.3 | 74.9 |
| $B_6$ | 0.4 platinum | 0.5 antimony | 4 indium | 74.1 | 73.5 |
| $U_1$ | 0.4 platinum | 0.004 antimony | 0.5 thallium | 76.6 | 76.1 |
| $U_2$ | 0.4 platinum | 0.004 antimony | 0.5 indium | 75.5 | 75.2 |
| $U_3$ | 0.4 platinum | 0.05 antimony | 0.5 thallium | 79.0 | 79.1 |
| $U_4$ | 0.4 platinum | 0.05 antimony | 0.5 indium | 78.8 | 79.0 |
| $U_5$ | 0.4 platinum | 0.40 antimony | 0.5 thallium | 79.6 | 79.4 |
| $U_6$ | 0.4 platinum | 0.40 antimony | 0.5 indium | 79.5 | 79.5 |
| $U_7$ | 0.4 platinum | 3 antimony | 0.5 thallium | 75.4 | 74.2 |
| $U_8$ | 0.4 platinum | 3 antimony | 0.5 indium | 75.1 | 73.5 |

EXAMPLE 3

Example 1 is repeated with a catalyst containing 0.3% by weight of platinum, 0.1% of iridium, 0.5% of antimony, 0.5% of thallium, and 1.12% of chlorine. The yield of $C_5^+$ (by weight), as obtained, was equal to 79.7% and the yield of $H_2$ (molar) in the recycle gas was 79.6%.

What is claimed is:

1. A catalyst containing an alumina carrier and, by weight with respect to the carrier, from 0.05 to 0.6% of at least one noble metal of the platinum family, from 0.005 to 5% of antimony, from 0.01 to 4% of a metal selected from gallium, indium and thallium and from 0.1 to 10% of halogen.

2. A catalyst according to claim 1, containing, by weight with respect to the carrier, from 0.1 to 0.5% of at least one noble metal of the platinum family, 0.03 to 3% of antimony and 0.05 to 3% of a metal selected from gallium, indium and thallium.

3. A catalyst according to claim 2, containing platinum, iridium, antimony and indium or thallium.

* * * * *